US010502295B2

(12) United States Patent
Kollreider

(10) Patent No.: US 10,502,295 B2
(45) Date of Patent: Dec. 10, 2019

(54) FURNITURE SYSTEM HAVING A LINEAR ACTUATOR

(71) Applicant: LOGICDATA Electronic & Software Entwicklungs GmbH, Deutschlandsberg (AT)

(72) Inventor: Daniel Kollreider, Graz (AT)

(73) Assignee: Logicdata Electronic & Software Entwicklungs GmbH, Deutschlandsberg (AT)

( * ) Notice: Subject to any disclaimer, the term of this patent is extended or adjusted under 35 U.S.C. 154(b) by 233 days.

(21) Appl. No.: 15/528,494

(22) PCT Filed: Nov. 13, 2015

(86) PCT No.: PCT/EP2015/076575
§ 371 (c)(1),
(2) Date: Aug. 2, 2017

(87) PCT Pub. No.: WO2016/079021
PCT Pub. Date: May 26, 2016

(65) Prior Publication Data
US 2017/0328449 A1 Nov. 16, 2017
US 2018/0149243 A9 May 31, 2018

(30) Foreign Application Priority Data

Nov. 21, 2014 (DE) .......................... 10 2014 117 071

(51) Int. Cl.
*F16H 15/28* (2006.01)
*A47B 9/04* (2006.01)
(Continued)

(52) U.S. Cl.
CPC ........... *F16H 25/2003* (2013.01); *A47B 9/04* (2013.01); *F16H 13/06* (2013.01); *F16H 37/02* (2013.01);
(Continued)

(58) Field of Classification Search
CPC .... F16H 15/28; F16H 15/52; A47B 2009/046
See application file for complete search history.

(56) References Cited

U.S. PATENT DOCUMENTS 8,674,572 B2 * 3/2014 Dietrich ................. A47C 3/265
310/68 B
2012/0068635 A1 * 3/2012 Koch ....................... A47B 9/04
318/135
(Continued)

FOREIGN PATENT DOCUMENTS

DE 3421952 A1 12/1984
DE 10259106 A1 7/2004
(Continued)

OTHER PUBLICATIONS

Machine translation of EP 2594157 filed Mar. 13, 2019. (Year: 2019).*

*Primary Examiner* — Tisha D Lewis
(74) *Attorney, Agent, or Firm* — Morgan, Lewis & Bockius LLP

(57) ABSTRACT

A furniture system having a furniture item which includes an electrically-adjustable component, a control unit and a linear actuator for adjusting a component of the furniture item is provided. The linear actuator includes a gear mechanism including a hollow element and a first stage formed as a friction wheel stage. The linear actuator further includes a motor on a drive side and an adjustment member arranged on an output side. The linear actuator, in particular the motor, the gear mechanism and the adjustment member are adapted to alter a length of the adjustment member using the motor and the gear mechanism. The control unit is coupled with the linear actuator and adapted to actuate the linear actuator for adjusting the component.

13 Claims, 4 Drawing Sheets

(51) Int. Cl.
   *F16H 25/20* (2006.01)
   *F16H 37/02* (2006.01)
   *F16H 57/00* (2012.01)
   *F16H 13/06* (2006.01)
   *F16H 13/02* (2006.01)
   *A47B 9/20* (2006.01)
   *A47C 1/02* (2006.01)
   *A47C 17/04* (2006.01)

(52) U.S. Cl.
   CPC ............ *F16H 57/0006* (2013.01); *A47B 9/20* (2013.01); *A47B 2009/046* (2013.01); *A47C 1/02* (2013.01); *A47C 17/04* (2013.01); *F16H 13/02* (2013.01); *F16H 25/20* (2013.01); *F16H 2025/2087* (2013.01)

(56) References Cited

U.S. PATENT DOCUMENTS

| | | | |
|---|---|---|---|
| 2012/0139395 A1 | 6/2012 | Dietrich | |
| 2013/0017920 A1* | 1/2013 | Sherrill | ............... F16H 13/10 475/183 |
| 2017/0059002 A1* | 3/2017 | Sasaki | ...................... B60J 5/10 |

FOREIGN PATENT DOCUMENTS

| | | |
|---|---|---|
| DE | 202010006168 U1 | 11/2011 |
| DE | 102012101890 A1 | 9/2013 |
| EP | 0203362 A1 | 12/1986 |
| EP | 0559626 A1 | 9/1993 |
| EP | 2594157 A2 | 5/2013 |

\* cited by examiner

FURNITURE SYSTEM HAVING A LINEAR ACTUATOR

BACKGROUND OF THE INVENTION

The present disclosure relates to a furniture system having a linear actuator for adjusting a component of a furniture item, e.g. for adjusting the height of a table or for adjusting the height or the position of a component of a lounging furniture item or a seating furniture item.

Linear actuators conventionally serve for adjusting two parts which are moveable relative to one another. Linear actuators are used in height-adjustable tables for lifting or lowering a table top on a rack of a table, for example. Typically, linear actuators include an electric motor, a gear mechanism and an adjustment member such as a spindle, for example. Besides the performance of the linear actuator, reliability and required construction space, the noise level of the linear actuators can be an essential quality criteria. The gear mechanism may represent a main source of noise development.

Noises in gear mechanisms, e.g. in toothed gear mechanisms, can result from production-related imprecisions, which may result in meshing errors, which in turn can induce vibration. To some extent, this problem can be reduced by gear components that are produced in a very precise manner, which however may considerably increase production costs of the linear actuator.

Linear actuators are available in two configurations. In a first configuration, the motor is arranged perpendicularly relative to the spindle system. Here, gear mechanisms with intersecting axles are employed. Worm gear or helical gear mechanisms can be used here, for example. In alternative constructions, motor and spindle can be arranged coaxially. In this case, the gear axles are coaxial as well. Planetary gears can be used, for example. However, customized solutions are possible as well, e.g. combinations of helical gears and planetary gear mechanisms.

Linear actuators of the first configuration can generally have of low noise level due to the design of the meshing in the worm gear mechanism or helical gear mechanism, but the angular arrangement comes with considerable disadvantages, in terms of product design, inter alia. In the configurations with planetary gears, the possible coaxial design is advantageous here. Nevertheless, noise generation, which can eventually be highly tolerance-dependent, is disadvantageous here.

Passive measures for noise reduction such as encapsulation of the gear mechanism may involve high spatial requirements and thermal problems.

SUMMARY OF THE INVENTION

The present disclosure provides an improved concept for a furniture system having a linear actuator for adjusting furniture components, which allows less noise generation and high flexibility in the use of the linear actuator.

In a linear actuator having a motor, an adjustment member and a gear mechanism, the improved concept is based upon the idea of using a friction gear mechanism or a gear mechanism with a friction gear stage for the transmission of a rotational movement from the motor to the adjustment member. As teeth will not mesh in the friction gear stage, a main cause of the noise generation can be eliminated. At the same time, a coaxial construction is possible, which can ensure the desired flexibility.

According to the improved concept, a linear actuator is provided for adjusting a component of a furniture item. The linear actuator includes a gear mechanism, which includes a hollow element and a first stage formed as a friction wheel stage. The linear actuator further includes a motor, which is arranged on a drive side, and an adjustment member, which is arranged on an output side. The linear actuator, in particular the motor, the gear mechanism and the adjustment member, are adapted to alter a length of the adjustment member by means of the motor and the gear mechanism.

The hollow element can be formed as a ring gear, for example, and is implemented in a housing of the gear mechanism in various embodiments, or is formed by the housing or by a part of the housing.

A rotational movement of a component of the motor, e.g. of a shaft connected to the gear mechanism, is transmitted to a rotational movement of an element of the adjustment member by means of the gear mechanism, resulting in a change of the length of the adjustment member.

In various embodiments of the linear actuator, the gear mechanism is formed as a coaxial gear mechanism. The gear mechanism has a fixed transmission ratio, for example.

In various embodiments, the first stage of the gear mechanism is formed as a planetary stage. In this case, the first stage includes at least one central element as well as at least two planetary elements.

The central element is connected to the motor on a drive side, via the shaft, for example. A rotational movement of the central element is transmitted to the planetary elements, which are coupled on an output side.

In various embodiments of the linear actuator, the planetary elements are arranged in the first stage between an inner surface of the hollow element and an outer surface of the central element. The planetary elements are connected to the hollow element and the central element in a force-fit manner.

In further embodiments, the planetary elements are configured in a cylindrical shape or are based on a cylindrical basic shape. Particularly shapes in which the cylindrical basic shape is supplemented by recesses or additionally attached elements are based upon a cylindrical basic shape. A hollow cylinder is considered a cylindrical basic shape as well. The hollow element and the central element are also configured as or based upon a cylindrical shape.

In various embodiments, the planetary elements are oversized with respect to a distance between the inner surface of the hollow element and the outer surface of the central element. This produces normal forces between the inner surface of the hollow element and the outer surface of the central element as well as between the outer surface of the central element and the planetary elements due to pinching of the planetary elements. Here, the force-fit connections of the planetary elements with the hollow element and the central element result from these normal forces.

The normal forces and the force-fit connections resulting therefrom, for example, enable a force transmission between the central element and the planetary elements, respectively a transmission of the rotational movement of the central element to the planetary elements.

In alternative embodiments, the planetary elements are of barrel-shape or conical design. In the case of a conical design of the planetary elements, the hollow element and/or the central element comprise conically-shaped elements as well.

Embodiments having conical planetary elements can cause a pre-stressing force between the planetary elements on the one hand and the central element and/or the hollow element on the other hand due to a wedge effect. A barrel-shaped design of the planetary elements can also cause a certain pre-stressing force by means of a wedge effect. In cylindrical designs of the planetary elements, the pre-stressing force can be formed by the above-described normal forces.

In various embodiments, the linear actuator includes a carrier element arranged on an output side, the carrier element having the planetary elements mounted thereon.

In such embodiments, the output-sided coupling of the planetary elements is realized via the carrier element. A rotational movement of the central element is initially transmitted to the planetary elements, and thereby to the carrier element. The carrier element is coupled to the adjustment member directly or indirectly via a second stage of the gear mechanism or via the second stage and further stages of the gear mechanism, for example.

In various alternative embodiments, the central element is connected to the motor not via the drive side. In such embodiments, at least one of the hollow element and the carrier element is connected to the motor on the drive side.

In further embodiments, output-sided coupling of the planetary elements is not realized via the carrier element. In such embodiments, coupling of the planetary elements on the output side is realized via at least one of the central element and the hollow element.

In various embodiments of the linear actuator, each of the planetary elements includes a cylindrical sleeve, which is mounted to the carrier element in a rotationally-movable manner, e.g. slid or pushed on the carrier element. The planetary elements additionally include a friction pad connected to the surface of the sleeve. The friction pad can be elastically-deformable, thereby enabling the pinching of the planetary elements.

In various embodiments of the linear actuator, the friction pad includes a plastic material, an elastomer plastic material, an elastomeric polyurethane, and/or a plastic composite material, e.g. a synthetic fiber composite material. The plastic composite material may include multiple bonded layers of a linen or cotton fabric, for example. Bonding can be effected by means of a resin such as a phenolic resin. Other plastic materials of the friction pad may include natural rubber materials, silicones, polyethylenes, and/or polytetrafluoroethylene.

In various embodiments of the linear actuator the hollow element includes a plastic material, a thermoplastic material and/or a polyoxymethylene.

In various embodiments, the planetary elements, the friction pad, the sleeves, the hollow element and/or the central element include a plastic material, a steel, a hardened steel, a cast iron, a grey cast iron, aluminum, brass and/or a metal-polymer material.

In various embodiments of the linear actuator, the gear mechanism includes a second stage, which is configured as a friction wheel stage or as a conventional stage, in particular as a toothed gear stage. In various embodiments, the second stage is formed as a planetary stage.

The second stage is arranged between the first stage and the adjustment member in the gear system. The second stage is connected with the first stage. The first and second stages are adapted to transmit a rotational movement of the first stage, e.g. of the planetary elements and/or the carrier element, into a rotational movement of the second stage, e.g. of further planetary elements or a further carrier element of the second stage.

In various embodiments of the linear actuator, the adjustment member includes a telescopic spindle, a threaded spindle or another spindle or spindle assembly.

In various embodiments of the linear actuator, the first stage of the gear mechanism has a first speed ratio, e.g. a fixed first speed ratio, with respect to a rotational speed of the motor. In this case, the first speed ratio corresponds to a ratio of a rotational speed of e.g. the central element to a rotational speed of e.g. the carrier element.

In various embodiments, the second gear stage has a second speed ratio, for example a fixed second speed ratio with respect to a rotational speed of the motor. In this case, the second speed ratio corresponds to a ratio of a rotational speed of e.g. the central element, to a rotational speed of e.g. the further carrier element.

In various embodiments, the first and/or the second speed ratio is greater than one. That is, the rotational speed of the motor is greater than the rotational speed of e.g. the carrier element and of the further carrier element. In various embodiments, the second speed ratio is greater than the first speed ratio. That is, the rotational speed of the carrier element is greater than the rotational speed of the further carrier element. As a result, such embodiments are provided with a two-stage gear reduction.

Various embodiments of the linear actuator include a position sensor, e.g. configured as a Hall sensor. The position sensor is adapted to determine a position of the gear mechanism, in particular a position of a component of the gear mechanism.

In further embodiments of the linear actuator, the position sensor is adapted to generate a position signal for determining a position of the linear actuator and/or of the adjustment member. The position of the adjustment member particularly refers to the length of the adjustment member or to an amount of change of the length of the adjustment member. The position signal may include information of a rotational position and/or a number of revolutions of the component of the gear mechanism.

In various embodiments, the position sensor is adapted to generate the position signal based on the determined position of the gear mechanism.

The furniture item comprises a control unit for actuating the linear actuator, for example. In various embodiments, the position sensor is coupled to the control unit and adapted to transmit the position signal to the control unit. The control unit can then determine the position of the adjustment member, for example depending on a time characteristic of the position signal.

In various embodiments, the position sensor is mounted in or on the gear mechanism, preferably on the output side. The position sensor is arranged on or in a stage of the gear mechanism adjoining the adjustment member, for example. In embodiments of the linear actuator, which have exactly two gears stages, the position sensor is arranged preferably on the output side on the second stage.

In embodiments in which the position sensor is mounted on the output side on the second stage, the position sensor determines the position of the gear mechanism for example by determining a rotational position of the further carrier element and/or at least one of the further planetary elements.

Synchronization of multiple linear actuators, in particular of actuators according to the improved concept, can be achieved by determining the position of the linear actuator and/or the adjustment member, for example. Furthermore, an impact of slip in the gear mechanism on the determination of the position of the adjustment member can be reduced or eliminated by arranging the position sensor on the output side, for example.

A linear actuator according to the improved concept can be implemented in a furniture system, for example. The furniture system includes a furniture item such as a table, a bed, a chair, an armchair or another seating or reclining furniture item. The furniture system includes an electrically-adjustable component. The component can be a height-adjustable table top of a table or an adjustable backrest or seating surface of a chair or an armchair, for example.

The furniture system further includes a control unit and at least one drive having a linear actuator according to the improved concept, adapted to adjust the component of the furniture item. The control unit is coupled to the actuator and adapted to actuate the linear actuator for adjusting the component.

Various embodiments of the furniture system include at least one further drive with a further actuator according to the improved concept, which is coupled to the control unit. The control unit is adapted to actuate the linear actuator and the further linear actuator for adjusting the component of the furniture item. The linear actuator and the further linear actuator each include a position sensor as described above. The control unit is coupled to the position sensors and adapted to determine positions of the adjustment members of the linear actuator and of the further linear actuator depending on the position signals. The control unit is also adapted to synchronize the position of the adjustment members by actuating the linear actuator and the further linear actuator.

In alternative embodiments of the furniture system, the drive and/or the other drive includes the control unit.

The invention will be explained by example embodiments by means of Figures. Like reference numerals indicate elements or components of identical function. As far as elements or components correspond in their respective functions, description thereof is not necessarily repeated in the figures below.

DETAILED DESCRIPTION

Figure 1:
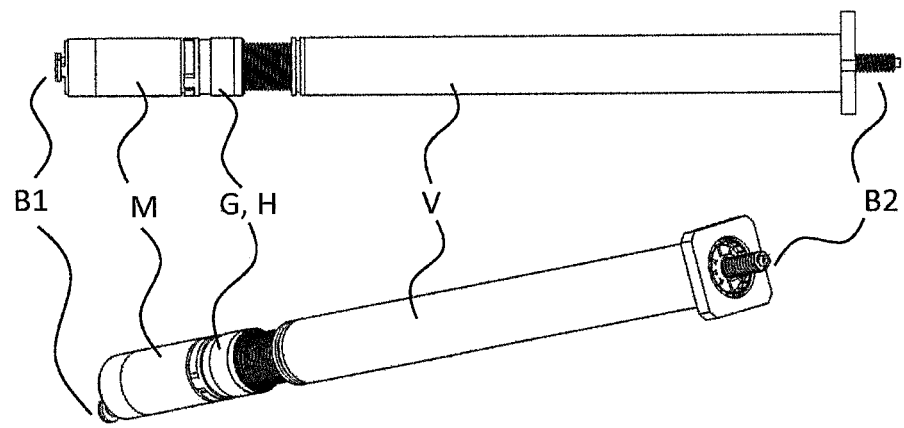
FIG. 1 an example embodiment of a linear actuator according to the improved concept.

FIG. 1 shows an example of an embodiment of a linear actuator according to the improved concept. The upper part of FIG. 1 shows a side view of the linear actuator, whereas the lower part of FIG. 1 shows a perspective view of this linear actuator.

The linear actuator includes a gear mechanism G, a motor M, which is coupled to the gear mechanism G on the drive side, as well as an adjustment member V connected to the gear mechanism G on the output side. The linear actuator further comprises a first fastening element B1 fixed to the motor M and a second fastening member B2 fixed to the adjustment member V.

The adjustment member V includes a telescopic spindle. Exemplary embodiments of the adjustment member V are shown in documents DE 10 2012 102 298 A1 as well as DE 10 2012 013 979 A1, the disclosures of which are incorporated in their entirety into the present document by reference.

In the illustrated embodiment of the linear actuator, the gear mechanism G includes a hollow element H, which is formed by a housing of gear mechanism G. The gear mechanism G is formed as a coaxial gear mechanism and includes a first stage G1 (not shown in FIG. 1, see FIGS. 3A, 4A and 4B), which is formed as a friction gear stage.

The linear actuator for adjusting a component of a furniture item, e.g. a table, can be fastened to the furniture item and/or the component by means of the fastening elements B1, B2.

The motor M produces a rotational movement during operation, the rotational movement being transmitted from the gear mechanism G to the adjustment member V and translated from the adjustment member V into a linear movement, in particular a length adjustment of the adjustment member V.

The motor M is formed as an electric motor, preferably a DC motor, a brushless DC motor, for example. An operating point of the motor M may include a drive-sided rotational speed in the range of several thousand revolutions per minute, e.g. about 5,000 $min^{-1}$, and a drive-sided torque in the range of several tenths of Nm, for example about 0.1 Nm to 0.2 Nm. Depending on the application, other operating points are of course also possible.

An output-side rotational speed of the gear mechanism G can range from several hundred to a few thousand revolutions per minute, for example in a range from 700 to 1,000 $min^{-1}$. Compared to the values for the drive-side rotational speed mentioned above, this corresponds to a transmission ratio of about 5 to 7. A corresponding output-side torque may be in the range of 1 Nm, e.g. 0.7 to 1 Nm, for example. In this case as well, the characteristic values may take other values depending on the application.

Figure 2:
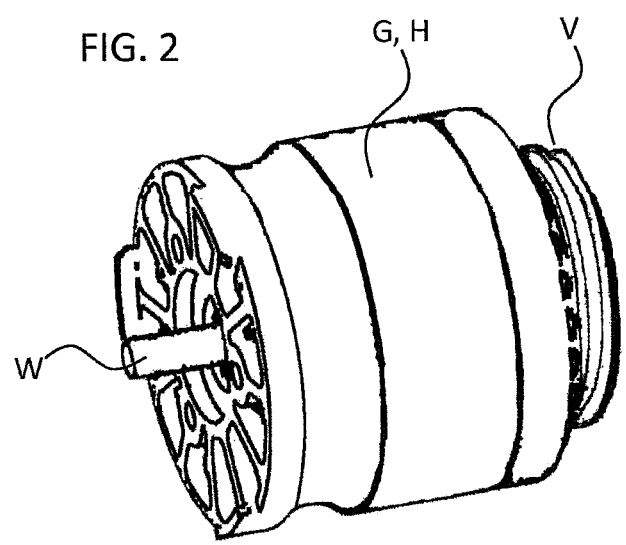
FIG. 2 a part of another example embodiment of a linear actuator according to the improved concept.

FIG. 2 shows part of another exemplary embodiment of a linear actuator according to the improved concept. The linear actuator corresponds to the linear actuator shown in FIG. 1, for example. For the sake of clarity, part of the linear actuator, in particular the fastening elements B1, B2, parts of the motor M as well as of the adjustment member V are not shown in FIG. 2.

The gear mechanism G includes the hollow element H, which is formed by the housing G. In the embodiment shown, the hollow element H is made of a plastic material, polyoxymethylene for example.

The gear mechanism G is connected with a shaft W (only shown in part here) on the drive side. In one embodiment of the linear actuator, the shaft W is connected to the motor M. Furthermore, part of the adjustment member V or of the telescopic spindle is shown, which is connected to the gear mechanism G on the output side.

Figure 3A:
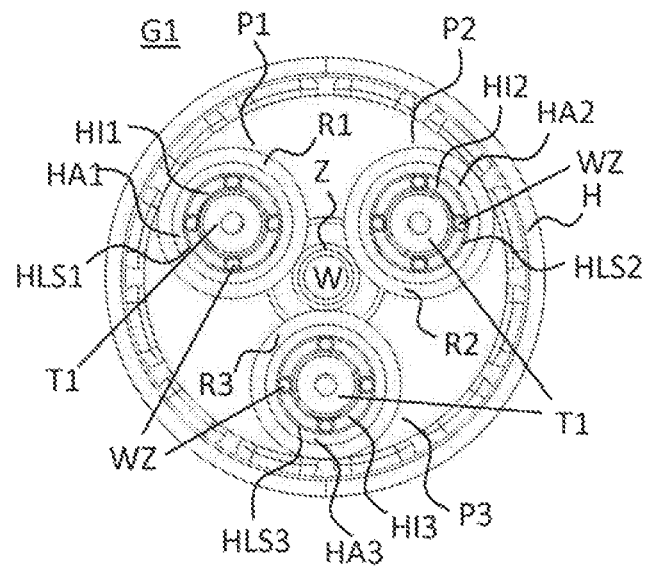
FIG. 3A a cross-section through a first stage of a gear mechanism of a linear actuator according to the improved concept.

FIG. 3A shows a cross-section through a first stage G1 of a gear mechanism G of a linear actuator according to the improved concept. The linear actuator corresponds to the linear actuator shown in FIGS. 1 and 2, for example.

The first stage G1 is configured as a coaxial friction wheel stage and planetary stage. The first stage G1 includes a cylindrical central element Z coupled to the shaft W. The first stage further includes a first cylindrical planetary element P1, a second cylindrical element P2 as well as a third cylindrical planetary element P3. The planetary elements P1, P2, P3 are arranged rotationally-symmetrical around the central element Z and connected to an inner surface of the hollow element H and an outer surface of the central element Z. Alternatively, the planetary elements P1, P2 and P3 may also be arranged asymmetrically. In the embodiment shown, the central element Z is made from steel, for example.

The planetary elements P1, P2, P3 of the first stage G1 are configured as frictional planets. The frictional planetary elements P1, P2, P3 include a first friction pad 1, a second friction pad R2 or a third friction pad R3, respectively, as well as a first sleeve HLS1, a second sleeve HLS2, and a third sleeve HLS3, respectively. In the embodiment shown, sleeves HLS1, HLS2, HLS3 each comprise an outer sleeve HA1, HA2, HA3 as well as an inner sleeve HI1, HI2, HI3. Inner sleeves HI1, HI2, HI3 each include four rollers WZ in the embodiment shown. The sleeves HLS1, HLS2 and HLS3 are mounted to a carrier element T1 in a rotationally-movable manner. Here, rotational movability is given by a rotationally-movable arrangement of rollers WZ in the inner sleeves HI1, HI2, HI3.

In alternative embodiments, the planetary elements P1, P2, P3 include one-piece sleeves instead of the two-piece configuration, shown here, of the sleeves HLS1, HLS2, HLS3 having outer sleeves HA1, HA2, HA3 and inner sleeves HI1, HI2, HI3. In particular, the sleeves do not include rollers WZ in such embodiments. In such embodiments, sleeves HLS1, HLS2, HLS3 directly rest on the carrier element T1 in a rotationally-movable manner.

In the embodiment shown, inner sleeves HI1, HI2, HI3, outer sleeves HA1, HA2, HA3 and rollers WZ are made of a metal, e.g. brass, or of a plastic material, for example. Friction pads R1, R2, R3 are made e.g. of an elastomeric plastic in the embodiment shown. The first friction pad R1 is glued to or cast with the first sleeves HLS1, the second friction pad is glued to or cast with the second sleeve HLS2, and the third friction pad is glued to or cast with the third sleeve HLS3. A cyano-acrylate glue can be used for gluing, for example. The first stage G1 is connected to the motor M via the shaft W.

The force-fit connections of the planetary elements P1, P2 P3 with the inner surface of the hollow element H and the outer surface of the central element Z preferably result from oversizes of the planetary elements P1, P2, P3, in particular radial oversizes with respect to a distance between the inner surface of the hollow element and the outer surface of the central element. This produces normal forces between the inner surfaces of the hollow element and the planetary elements as well as between the outer surface of the central element and the planetary elements and thus the force-fit connections. The normal forces per planetary element can be in the range of several ten Nm, e.g. about 60-70 Nm, for example.

In alternative embodiments of the linear actuator, the number of the planetary elements P1, P2, P3 may be other than three. In particular, the first stage G1 may include only 2, but also four, five or more planetary elements.

Figure 3B:
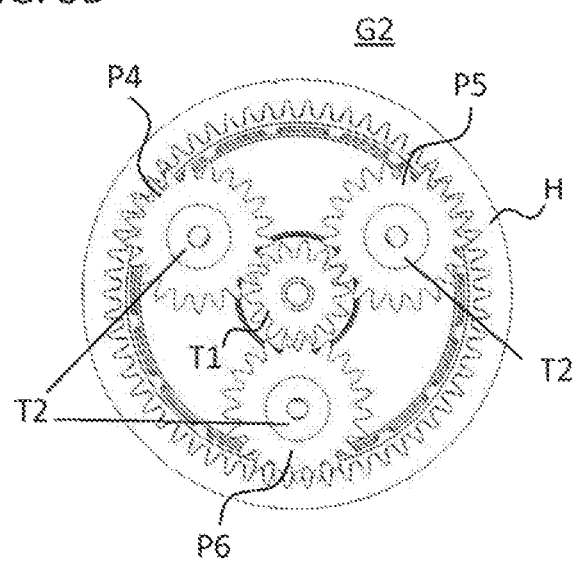
FIG. 3B a cross-section through a second stage of a gear mechanism of a linear actuator according to the improved concept.

FIG. 3B shows a cross-section through a second stage G2 of a gear mechanism G of a linear actuator according to the improved concept. The gear mechanism G and the linear actuator correspond to the ones shown in FIG. 3A, respectively.

The second stage G2 is configured as a coaxial toothed gear stage and planetary stage. The second stage G2 includes further planetary elements P4, P5, P6, i.e. a fourth planet element P4, a fifth planet element P5 as well as a sixth planetary element P6. The further planetary elements P4, P5, P6 are configured as toothed gear planets. Accordingly, the hollow element H is equipped with internal teeth in the area of the second stage G2, which are engaged by the teeth of the further planetary elements P4, P5, P6.

The further planetary elements P4, P5 P6 are mounted on a further carrier element T2 in a rotationally-movable manner. Alternatively, the further planetary elements P4, P5 P6 can also be fixedly connected with components of the further carrier element T2. The components are then per se supported in a rotationally-movable manner. The further carrier element T2 is connected to the adjustment member V via a second shaft, for example. The further carrier element T2 can be supported on a bearing, e.g. a roller bearing, for example. The carrier element Ti is equipped with externally-located teeth on the side of the second stage G2, which teeth are engaged by the teeth of the further planetary elements P4, P5, P6. With respect to the second stage G2, the carrier element T1 serves as a further central element for the further planetary elements P4, P5, P6. The further planetary elements P4, P5, P6 are arranged around a center of the first carrier element T1 in a rotationally-symmetrical manner, but may alternatively also be arranged asymmetrically.

In alternative embodiments, the number of the further planetary elements P4, P5, P6 may be other than three. In particular, the second stage G2 may only include two, but as well four, five or more planetary elements.

In alternative embodiments, the second stage G2 may as well be configured as a friction wheel stage analogously to the first stage G1 shown in FIG. 3A.

In various embodiments, the linear actuator includes a position sensor configured as a Hall sensor, for example. In embodiments based on the one shown in FIGS. 3A and 3B, the position sensor is adapted to determine a position, e.g. of a further carrier element, for example. The position of the further carrier element T2 may include a rotational position and/or a number of revolutions of the further carrier element T2, for example.

Figure 4A:
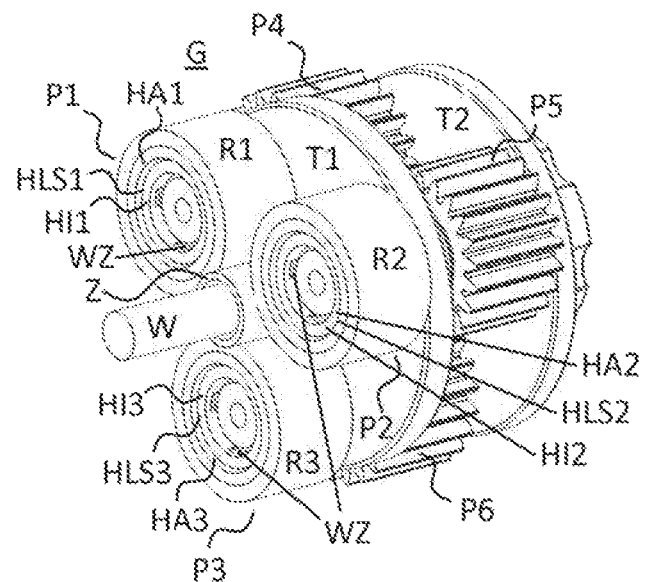
FIG. 4A a detailed view of a gear mechanism in an example embodiment of the linear actuator according to the improved concept.
Figure 4B:
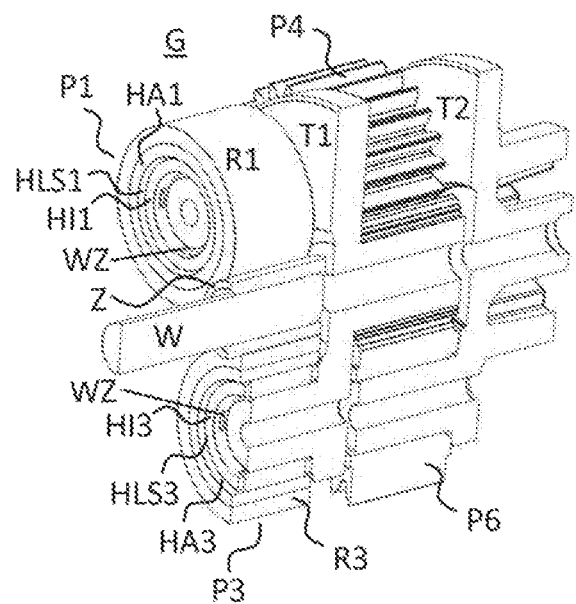
FIG. 4B another detailed view of a gear mechanism in an example embodiment of the linear actuator according to the improved concept.

FIGS. 4A and 4B show a perspective detailed view of the gear mechanism G shown in FIGS. 3A and 3B. Here, a longitudinal section through the gear mechanism G is shown. The following explanations refer to both FIG. 4A and FIG. 4B.

The gear mechanism G includes a first stage G1 and a second stage G1 according to the embodiments shown in FIGS. 3A and 3B. In alternative embodiments, the second stage G2 may also be formed as a friction wheel stage analogously to the first stage G1 shown in FIG. 3A.

The first and second stages G1, G2 are connected to one another via the carrier element T1. A rotational movement of the shaft W is generated via the motor M. This rotational movement is translated into a rotational movement of the central element Z. The rotational movement of the central element Z is translated into a rotational movement of the planetary elements P1, P2, P3 about themselves and into a rotational movement of planetary elements P1, P2, P3 about the central element Z due to the force-fit connections between the central element Z and the planetary elements P1, P2 and P3 and the hollow element H. This also causes a rotational movement of the carrier element T1.

Due to the meshing between the teeth of the further planetary elements P4, P5, P6 and the teeth of the carrier element T1 located on the outside with respect to the second stage G2 and the teeth of the hollow element H located on the inside, the rotational movement of the carrier element T1 is translated into a rotational movement of the further planetary elements P4, P5, P6 about themselves as well as into a rotational movement of the further planetary elements P4, P5, P6 about the further central element. This results in a rotational movement of the further carrier element T2, which is transmitted to the adjustment member V via the second shaft, in particular to the telescopic spindle, for example. Finally, the adjustment member V translates the rotational movement into a linear movement, in particular into a length alteration of the adjustment member V.

The structure of the gear mechanism in a linear actuator according to the improved concept can be formed in one or multiple stages. In a multistage gear mechanism G, the first stage G1 of gear mechanism G is configured as a friction wheel stage, whereas at least one of the second stage G2 and the further stages can be formed in a conventional construction, since the dominant noise source is the first stage G1 with the first speed ratio, for example.

Various embodiments of the linear actuator corresponding to the improved concept comprise a gear mechanism G having an improved noise quality when compared to a worm gear, for example. Furthermore, embodiments of the linear actuator which have a coaxial gear structure allow high flexibility when using the linear actuator.

Further advantages of the linear actuator according to the improved concept may include low construction effort, low maintenance effort, a direction reversal without clearance and less effort in lubricating the gear mechanism G or a potential dispense with lubrication.

Figure 5:
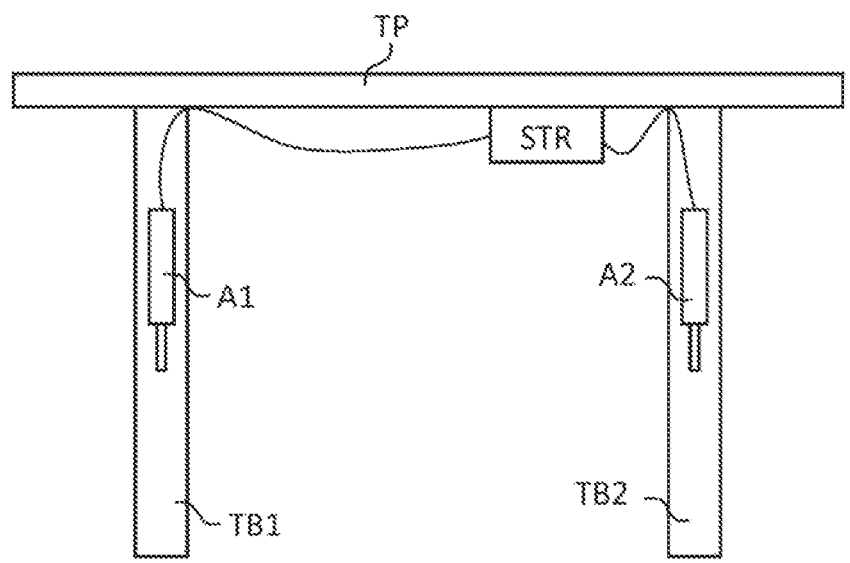
FIG. 5 an example embodiment of a furniture system having linear actuators according to the improved concept.

FIG. 5 shows an exemplary embodiment of a furniture system having linear actuators according to the improved concept. In the present example, the furniture system includes a table with a table top, a first table leg TB1 and a second table leg TB2, for example. Table legs TB1, TB2 have a first drive A1 or a second drive A2 mounted thereon. The furniture system further includes a control unit STR, which is fixed to the tabletop TP and connected to the drives A1, A2, for example.

The first and second drives A1, A2 each include a linear actuator according to the improved concept. The control unit STR is adapted to actuate the linear actuators. The linear actuators are adapted to adjust a height of the tabletop TP depending on the actuation by the control unit STR.

The linear actuators each comprise a position sensor as described with reference to FIG. 3A, for example. The control unit STR is coupled to the position sensors and adapted to determine positions of the adjustment members V of the linear actuators depending on the position signals. The control unit STR is also adapted to synchronize the linear actuators, in particular the positions of the adjustment members V, by actuating the linear actuators. Synchronization of the linear actuators allows achieving an optimized adjustment of the table top TP, for example.

The invention claimed is:

1. A furniture system with a furniture item including an electrically-adjustable component, a control unit and a linear actuator for adjusting a component of the furniture item, the linear actuator including:
a gear mechanism which includes a hollow element and a first stage configured as a friction wheel stage;
a motor arranged on a drive side; and
an adjustment member arranged on an output side,
wherein
the linear actuator is adapted to alter a length of the adjustment member through the motor and the gear mechanism,
the control unit is coupled with the linear actuator and adapted to actuate the linear actuator for adjusting the component,
the first stage is formed as a planetary stage having at least one central element as well as at least two planetary elements,
the planetary elements in the first stage are arranged between an inner surface of the hollow element and an outer surface of the central element,
the planetary elements are connected to the hollow element and the central element in a force-fit manner,
the linear actuator includes a support element arranged on an output side and having the planetary elements mounted thereon, and
each of the planetary elements includes in each case one sleeve, in particular a cylindrical sleeve, which is mounted on the support element in a rotationally-movable manner and which includes a friction pad connected to the surface of the sleeve.

2. The furniture system according to claim 1, wherein the gear mechanism is formed as a coaxial gear mechanism.

3. The furniture system according to claim 1, wherein the planetary elements, the central element as well as the hollow element are of cylindrical shape.

4. The furniture system according to claim 1, wherein
the planetary elements have an oversize,
normal forces between the inner surface of the hollow element and the planetary elements as well as between the outer surface of the central element and the planetary elements are generated by the oversize, and
the force-fit connections of the planetary elements with the hollow element and the central element result from the normal forces.

5. The furniture system according to claim 1, wherein the friction pad includes an elastomer plastic material, an elastomer polyurethane and/or a composite plastic material.

6. The furniture system according to claim 1, wherein the gear mechanism includes a second stage which is formed as a toothed gear stage.

7. The furniture system according to claim 1, wherein the adjustment member includes a telescopic spindle, a threaded spindle or another spindle.

8. The furniture system according to claim 1, wherein the linear actuator also includes a position sensor which is adapted to determine a position of the gear mechanism.

9. The furniture system according to claim 8, wherein the position sensor is adapted to generate a position signal for determining a position of the adjustment member.

10. The furniture system according to claim 9, further including at least one further linear actuator which is adapted and arranged on the furniture item to adjust the component, wherein
the further linear actuator includes a further gear mechanism, a further adjustment member and a further position sensor,
the further position sensor is adapted to determine a position of the further gear mechanism and to generate a further position signal for determining a position of the further adjustment member based on the determined position of the further gear mechanism, and the control unit is adapted to
- actuate the further linear actuator for adjusting the component of the furniture item,
- determine the positions of the adjustment member and of the further adjustment member depending on the position signal and the further position signal, and
- synchronize the positions of the adjustment member and the further adjustment member by actuating the linear actuator and the further linear actuator.

11. The furniture system according to claim 10, wherein
the further linear actuator includes a further motor arranged on a drive side,
the further gear mechanism includes a further hollow element and a further first stage formed as a friction wheel stage, and
the further linear actuator is adapted to alter a length of the further adjustment member through the further motor and the further gear mechanism.

12. A furniture system with a furniture item including an electrically-adjustable component, a control unit and a linear actuator for adjusting a component of the furniture item, the linear actuator including:
- a gear mechanism which includes a hollow element and a first stage configured as a friction wheel stage;
- a motor arranged on a drive side;
- an adjustment member arranged on an output side, wherein the linear actuator is adapted to alter a length of the adjustment member through the motor and the gear mechanism, and wherein the control unit is coupled with the linear actuator and adapted to actuate the linear actuator for adjusting the component;
- a position sensor which is adapted to determine a position of the gear mechanism, wherein the position sensor is adapted to generate a position signal for determining a position of the adjustment member; and
- at least one further linear actuator which is adapted and arranged on the furniture item to adjust the component, wherein
the further linear actuator includes a further gear mechanism, a further adjustment member and a further position sensor,
the further position sensor is adapted to determine a position of the further gear mechanism and to generate a further position signal for determining a position of the further adjustment member based on the determined position of the further gear mechanism, and
the control unit is adapted to
- actuate the further linear actuator for adjusting the component of the furniture item,
- determine the positions of the adjustment member and of the further adjustment member depending on the position signal and the further position signal, and
- synchronize the positions of the adjustment member and the further adjustment member by actuating the linear actuator and the further linear actuator.

13. The furniture system according to claim 12, wherein
the further linear actuator includes a further motor arranged on a drive side,
the further gear mechanism includes a further hollow element and a further first stage formed as a friction wheel stage, and
the further linear actuator is adapted to alter a length of the further adjustment member through the further motor and the further gear mechanism.

* * * * *